United States Patent
Choi (10) Patent No.: US 9,313,368 B2
(45) Date of Patent: Apr. 12, 2016

(54) METHOD FOR COMPRESSING IMAGE DATA COLLECTED BY CAMERA AND ELECTRONIC DEVICE FOR SUPPORTING THE METHOD

(71) Applicant: Samsung Electronics Co., Ltd, Gyeonggi-do (KR)

(72) Inventor: Youngkeun Choi, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 69 days.

(21) Appl. No.: 14/155,117

(22) Filed: Jan. 14, 2014

(65) Prior Publication Data

US 2014/0198233 A1    Jul. 17, 2014

(30) Foreign Application Priority Data

Jan. 14, 2013    (KR) .................. 10-2013-0003842

(51) Int. Cl.

| H04N 1/41 | (2006.01) |
|---|---|
| H04N 5/917 | (2006.01) |
| H04N 1/21 | (2006.01) |
| H04N 19/172 | (2014.01) |
| H04N 19/46 | (2014.01) |
| H04N 19/115 | (2014.01) |
| H04N 19/60 | (2014.01) |
| H04N 19/593 | (2014.01) |
| H04N 19/14 | (2014.01) |
| H04N 19/152 | (2014.01) |
| H04N 19/194 | (2014.01) |

(52) U.S. Cl.
CPC .............. *H04N 1/41* (2013.01); *H04N 1/2112* (2013.01); *H04N 1/2125* (2013.01); *H04N 5/917* (2013.01); *H04N 19/115* (2014.11); *H04N 19/14* (2014.11); *H04N 19/152* (2014.11); *H04N 19/172* (2014.11); *H04N 19/194* (2014.11); *H04N 19/46* (2014.11); *H04N 19/593* (2014.11); *H04N 19/60* (2014.11); *H04N 2201/325* (2013.01)

(58) Field of Classification Search
None
See application file for complete search history.

(56) References Cited

U.S. PATENT DOCUMENTS

| 5,638,498 | A | * | 6/1997 | Tyler ...................... G06K 15/00 358/1.16 |
|---|---|---|---|---|
| 2006/0218482 | A1 | * | 9/2006 | Ralston et al. ............. 715/500.1 |

(Continued)

FOREIGN PATENT DOCUMENTS

| EP | 0871333 A2 | 10/1998 |
|---|---|---|
| EP | 0928098 A2 | 7/1999 |
| EP | 0952729 A2 | 10/1999 |

OTHER PUBLICATIONS

Extended European Search Report dated Oct. 2, 2014 in connection with European Patent Application No. 14150822.6; 15 pages.

(Continued)

*Primary Examiner* — Shahbaz Nazrul (57) ABSTRACT

A technique is provided to allow an optimal image data compression by compressing image data, collected by a camera, on a more suitable compression condition. In a method for compressing image data, an electronic device generates preview data of an original image collected through the camera, calculates a first compression ratio based on analyzing complexity of the preview data relating to pixel distribution of the original image, and compresses a capture image, selected in response to a capture command, corresponding to the preview data on the basis of the calculated first compression ratio.

20 Claims, 3 Drawing Sheets

(56) References Cited

U.S. PATENT DOCUMENTS

2007/0126908 A1* 6/2007 Kim .................. H04N 1/00307
                                                    348/333.01
2007/0206102 A1* 9/2007 Yu et al. ..................... 348/222.1
2008/0292267 A1* 11/2008 Yamada et al. ................. 386/68
2009/0096927 A1* 4/2009 Camp, Jr. ............. G06K 9/3241
                                                    348/613
2009/0141795 A1 6/2009 Horle

OTHER PUBLICATIONS

Ahmad, et al.; "A Generic Content-Based Image Retrieval Framework for Mobile Devices"; Multimedia Tools and Applications 55:423-442; 2011; 20 pages.

European Search Report dated Apr. 28, 2014 in connection with European Patent Application No. 14150822.6, 7 pages.

* cited by examiner

METHOD FOR COMPRESSING IMAGE DATA COLLECTED BY CAMERA AND ELECTRONIC DEVICE FOR SUPPORTING THE METHOD

CROSS-REFERENCE TO RELATED APPLICATION(S) AND CLAIM OF PRIORITY

The present application is related to and claims the benefit under 35 U.S.C. §119(a) of a Korean patent application filed on Jan. 14, 2013 in the Korean Intellectual Property Office and assigned Serial No. 10-2013-0003842, the entire disclosure of which is hereby incorporated by reference.

TECHNICAL FIELD

The present disclosure relates to an image data compression technology and, more particularly, to a method for compressing image data collected by a camera on a suitable compression condition and an electronic device for supporting this method.

BACKGROUND

Nowadays a great variety of mobile devices having a communication function are increasingly popularized due to their high usability and good portability. With a touch screen much more enlarged and owing to a support by hardware and software that have ability to offer various contents, such electronic devices are now showing a dramatic growth.

Most of such mobile devices have therein a camera capable of capturing an image. Namely, by using an embedded camera, a mobile device can capture an image, store or edit the capture image, and transmit the capture image to other device.

Meanwhile, for good portability, mobile devices are normally limited in their sizes. Also, this limitation in size may restrict a data processing scheme with higher performance. For example, in an embodiment where a variable compression ratio is applied to images collected by a camera, a compression ratio can be optimized for a final image buffer size such that effective operations of related components can be allowed. However, data processing performed after a full buffer is applied to an original image may require unfavorably a great burden of operation in image data processing. Therefore, this technique is not suitable for mobile devices that use rapid image processing.

On the other hand, another technique using a fixed compression ratio may reduce the quality of a final image output when there is lower image complexity. Further, when there is higher image complexity, this technique may cause waste of buffer allocation for a final image output since the size of a final image output may be unfavorably increased.

SUMMARY

To address the above-discussed deficiencies, it is a primary object to provide a technique to allow an optimal image data compression by compressing image data, collected by a camera, on a more suitable compression condition.

An embodiment in this disclosure may provide a method for compressing image data of a camera, the method comprising: generating preview data of an original image collected through the camera; calculating a first compression ratio corresponding to complexity of the preview data by applying a variable compression technique to the preview data; and compressing a capture image corresponding to the preview data on the basis of the first compression ratio.

Another embodiment in this disclosure may provide an electronic device for compressing image data of a camera, the device comprising: a camera configured to collect an image; and a control unit configured to apply a variable compression technique to preview data of an original image collected through the camera, to calculate at least one of a first compression ratio for a capture image corresponding to the preview data and a second compression ratio for a thumbnail image corresponding to the capture image, and to compress at least one of the capture image and the thumbnail image on the basis of at least one of the first compression ratio and the second compression ratio.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
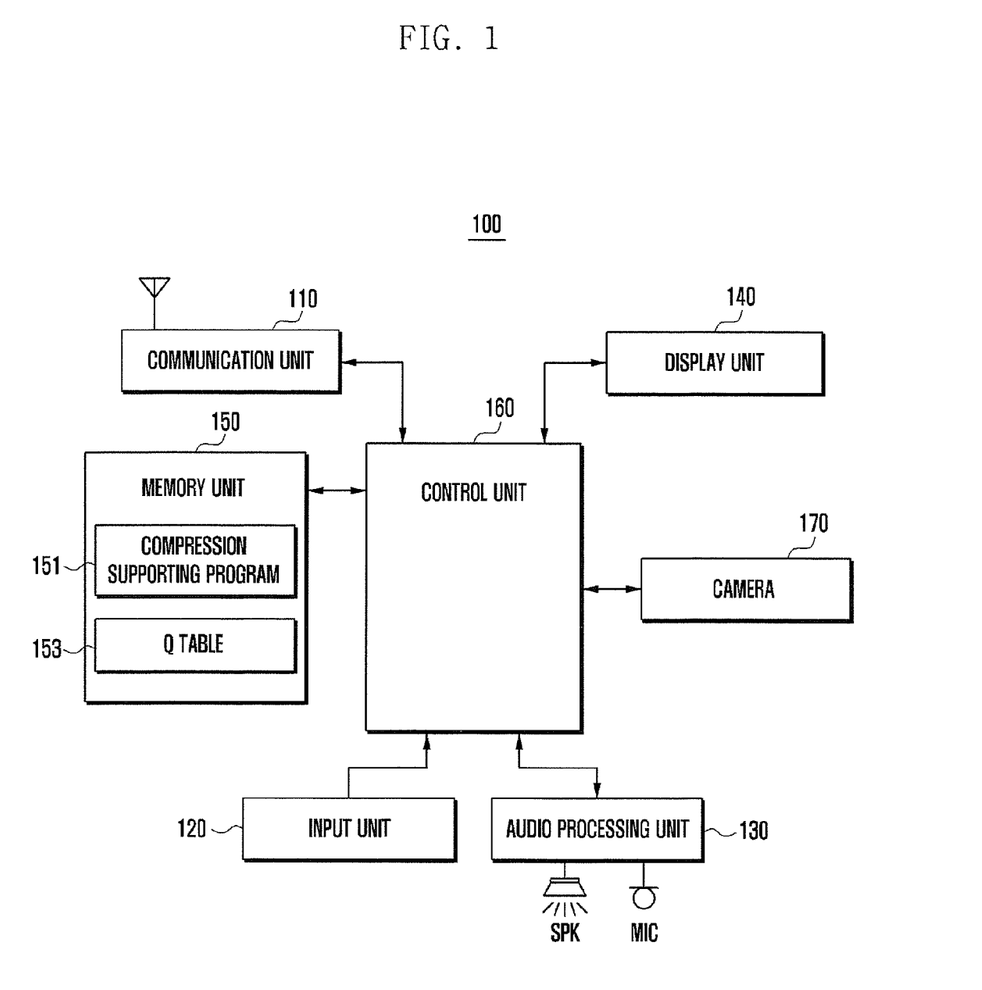
FIG. 1 illustrates a block diagram of an electronic device in accordance with an embodiment of the present disclosure.
Figure 2:
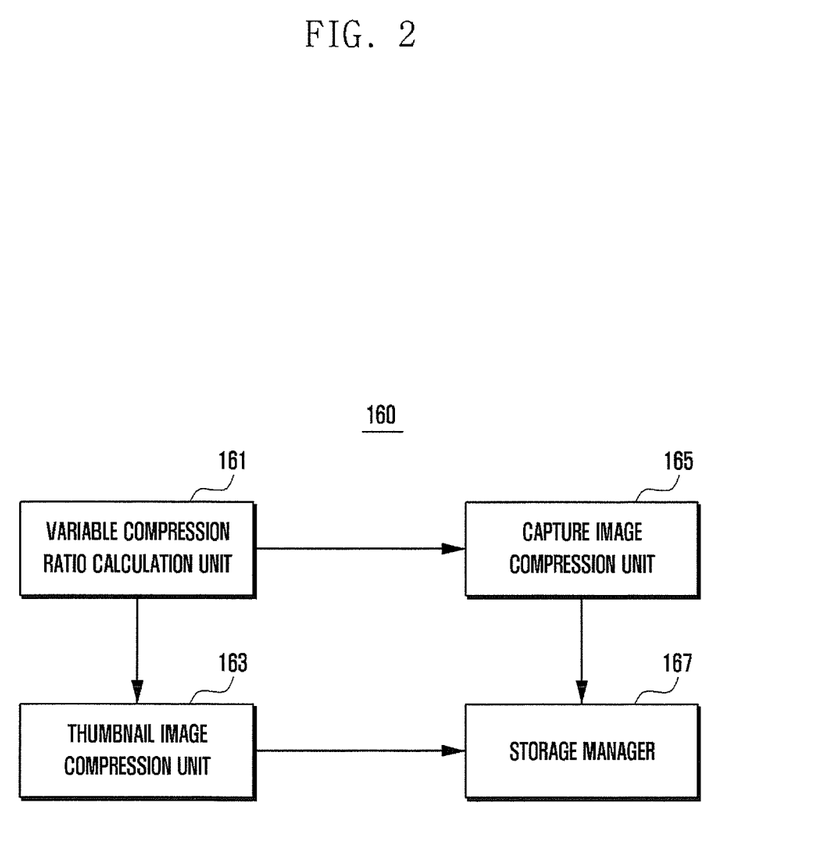
FIG. 2 illustrates a block diagram of a control unit of the electronic device shown in FIG. 1 in accordance with an embodiment of the present disclosure.
Figure 3:
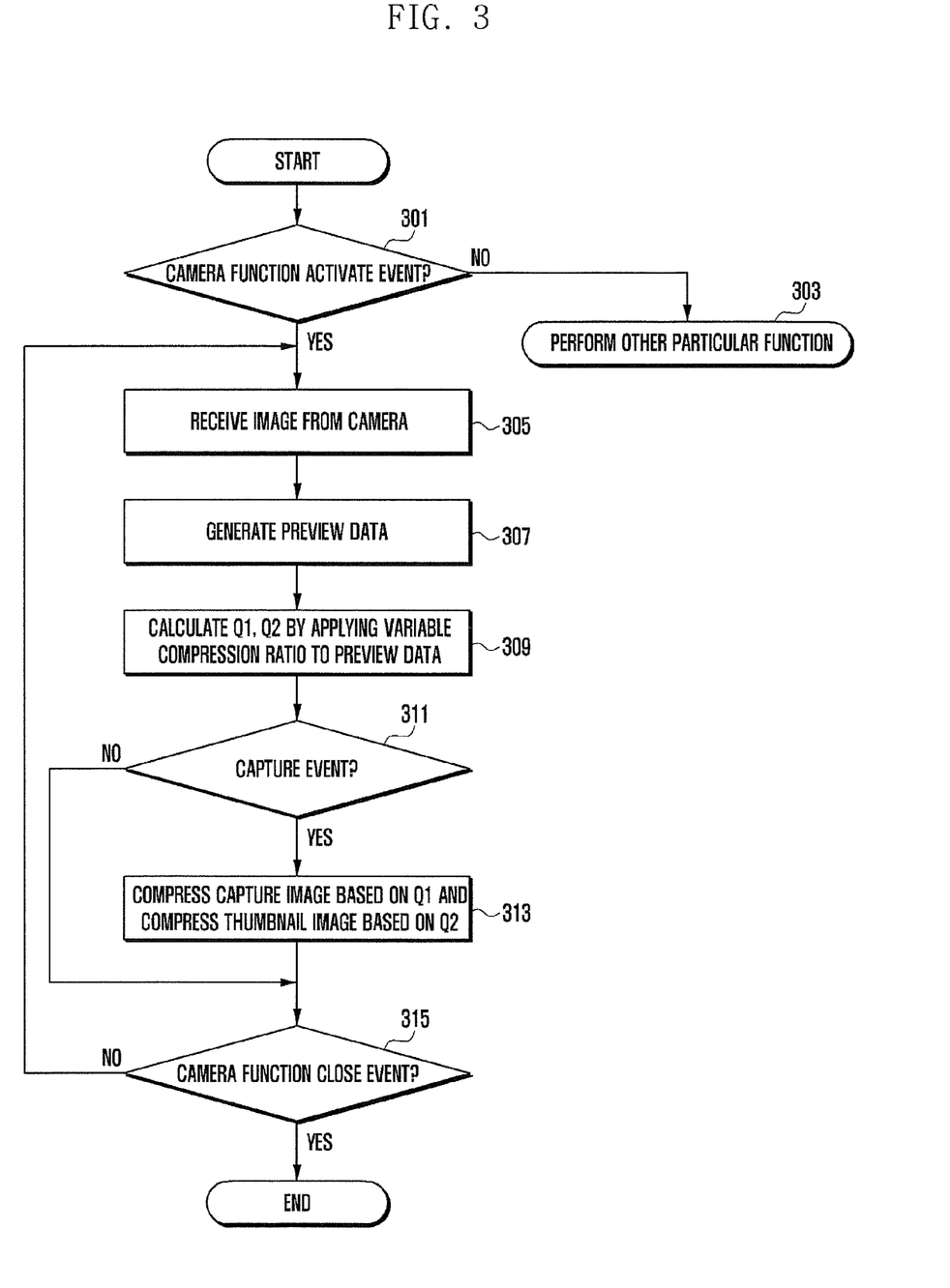
FIG. 3 illustrates a process of a method for compressing image data collected by a camera in accordance with an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "an image" includes reference to one or more of such images.

FIG. 1 is a block diagram illustrating an electronic device in accordance with an embodiment of the present disclosure.

Referring to FIG. 1, the device 100 may include a communication unit 110, an input unit 120, an audio processing unit 130, a display unit 140, a memory unit 150, a camera 170, and a control unit 160. Also, the device 100 may further include any module designed for collecting various kinds of tag information which may be obtained when the camera 170 collects images. For example, the device 100 may further include a location information acquisition unit such as a GPS for acquiring location information associated with a collection of images.

In this disclosure, the term 'an original image' refers to an image stored in a memory of the camera 170 without any data processing. The term 'an acquired image' refers to an image provided as preview data or preview frame data from an original image stored in a memory of the camera 170. This acquired image uses no additional encoding process but may be resized to a predefined size or adjusted in the number of pixels so as to be displayed on the display unit 140. An acquired image may have a smaller size or smaller pixels than an original image. The term 'a capture image' refers to an image captured at a specific time point in response to a capture command, among images stored in a memory of the camera 170, and then stored in the memory unit 150. This capture image passes an encoding process and also is compressed on a specific compression condition before stored in the memory unit 150. The term 'a thumbnail image' refers to an image generated together with a capture image and provided to a user such that a user can see a capture image. This thumbnail image includes a smaller size than a capture image. A thumbnail image may pass an encoding process and also be stored in the memory unit 150 in a specific format such as EXIF (EXchangable Image File format). A thumbnail image may be generated from at least one of a capture image, an acquired image (i.e., preview data), and an original image.

The device 100 may apply a variable compression technique to preview data acquired by the camera 170. In an embodiment, the device 100 may calculate the first compression condition optimized for image storage and, when a specific input event for capturing an image happens, for example, when a shutter event happens, may apply the calculated first compression condition to an image acquired at the time point of such an event. Therefore, the device 100 can provide the first compression condition optimized for a capture image.

Additionally, when applying a variable compression technique to preview data, the device 100 may also calculate the second compression condition optimized for thumbnail generation and then apply the calculated second compression condition to the generation of a thumbnail image. Therefore, the device 100 can provide the second compression condition optimized for a thumbnail image.

For the above, the camera 170 may acquire an image and then provide it as preview data under the control of the control unit 160. Also, the camera 170 may provide a capture image in response to a specific event received from the input unit 120 or the display unit 140 including an input function. The camera 170 may include a lens, an aperture, a memory, an image processing module, and the like. In one embodiment, the camera 170 may generate a real-time acquired image to be used as preview data and then deliver it to the control unit 160. In another embodiment, the camera 170 may provide an original image to the control unit 160, which may generate an acquired image, a capture image and a thumbnail image by using the received original image.

The input unit 120 may be configured to generate various input signals used for the operation of the device 100. The input unit 120 may employ any of various input mechanisms such as a keyboard, a keypad, key buttons, and the like. Additionally or alternatively, the input unit 120 may be realized in the form of a virtual touch pad so as to support a full touch screen. Such a virtual touch pad may be configured to be displayed on the display unit 140 and to generate an input signal in response to a user's touch gesture. In an embodiment, at a user's request, the input unit 120 may generate an input signal for activating the camera 170, an input signal for collecting images through the activated camera 170, an input signal for storing the collected images, or the like. Additionally, the input unit 120 may generate an input signal for applying a compression condition improving mode. In this disclosure, the term 'a compression condition improving mode' refers to a certain mode for calculating a compression condition by applying a variable compression ratio to preview data and also for applying the calculated compression condition to a capture image or a thumbnail image. If a compression condition improving mode is not set, a normal mode such as a fixed compression ratio mode may be applied. The above input signals may be delivered to the control unit 160 and converted into corresponding commands. Meanwhile, in an embodiment where the display unit 140 supports a touch-based input function, the display unit 140 may act as the input unit 120. Therefore, the above-discussed input signals may be generated through the display unit 140.

The audio processing unit 130 may be configured to process various audio signals generated during the operation of the device 100. The audio processing unit 130 may include a speaker (SPK) for outputting audio signals generated or decoded in the device 100, and a microphone (MIC) for collecting audio signals in connection with a voice call, a video call, a voice recording, or the like. Additionally, the audio processing unit 130 may support the output of various notification sounds, feedback sounds, and sound effects in connection with the operation of the camera 170. For example, the audio processing unit 130 may support outputting a shutter sound of the camera 170, a feedback sound associated with activation or inactivation of a compression condition improving mode, or a feedback sound associated with activation of the camera 170. Such sound outputs may be selectively inactivated depending on user's setting.

The display unit 140 may be configured to display various screens used for the operation of the device 100. For example, the display unit 140 may offer an idle screen, a menu screen, a lock screen, a specific screen on which a plurality of icons and/or widgets are arranged, and any other screens. In an embodiment, the display unit 140 may offer any screen associated with the operation of the camera 170 such as a preview screen showing preview data, a screen for capturing an image, or a screen showing a thumbnail image corresponding to a capture image. Additionally, the display unit 140 may display a specific icon or text that indicates activation of a compression condition improving mode when the camera 170 is activated. Also, the display unit 140 may display a menu item or icon for activating or inactivating a compression condition improving mode. Further, the display unit 140 may display an image search screen allowing a search for capture images, or a thumbnail search screen allowing a search for thumbnail images.

The communication unit 110 may be configured to support a communication function of the device 100. For example, the communication unit 110 may receive update information about functions of the camera 170 from a relevant server, transmit a capture image or thumbnail image to other device or server, or receive an image from other device or server. Additionally, when a thumbnail image is generated, the communication unit 110 may establish a communication channel used for collecting tag information to be contained in a thumbnail image. For example, if an image is captured at a specific location, the device 100 may access a server that provides a location-based service, transmit information about a current location to the server, and receive various kinds of information associated with a current location from the server. In this process, the communication unit 110 may form a communication channel between the server and the device 100. Tag information received from the server at a user's request may be delivered to the control unit 160.

The communication unit 110 may include at least one communication module to support one or more communication technologies based on 2G, 3G, 4G, or the like. The control unit 160 may activate the communication unit 110 at a user's request and control the communication unit 110 to establish a communication channel associated with a requested service.

The memory unit 150 may be configured to store various programs used for the operation of the device 100 and various data generated during the operation of the device 100. For example, the memory unit 150 may store an operating system (OS). In an embodiment, the memory unit may store a compression supporting program 151 for supporting a compression condition improving mode, and a Q table 153.

The compression supporting program 151 may provide an item used to select a compression condition improving mode. Additionally, the compression supporting program 151 may include the first calculation routine for calculating the first compression condition by applying a variable compression ratio to preview data when the camera 170 is running in a compression condition improving mode activated in response to a selection of the above item. Further, the compression supporting program 151 may include a routine for applying the first compression condition as an encoding compression condition for a capture image. The first calculation routine may perform a real-time calculation of the first compression condition with regard to preview data being provided by the camera 170. Among such first compression conditions obtained through a real-time calculation, the specific first compression condition obtained just before an image is captured may be applied as a compression condition for a capture image.

Also, the compression supporting program 151 may include the second calculation routine for calculating the second compression condition to be used for a thumbnail image by applying a variable compression ratio to preview data. And also, the compression supporting program 151 may include a routine for applying the second compression condition to a thumbnail image. The second calculation routine may include a routine for detecting a buffer size for a thumbnail image to be actually stored among the total buffer size allocated to a thumbnail image in in an embodiment where tag information or the like is added, and a routine for calculating the second compression condition to be applied to a thumbnail image on the basis of the detected buffer size. Namely, when a thumbnail image is generated using preview data or an original image, the second calculation routine may adjust the second compression condition depending on the size of tag information to be stored.

The Q table 153 is configured to store compression condition values to be used when a compression condition is detected on the basis of preview data. For example, the Q table 153 may store various values of a compression ratio as compression condition values. Additionally, the Q table 153 may offer various compression ratios of objects that constitute preview data. Such ratios may be used when a variable compression ratio is applied to preview data. Therefore, the control unit 160 may calculate a variable compression ratio of each object contained in preview data by referring to the Q table 153, and then, based on the calculated compression ratios, calculate a compression ratio to be applied as the first compression condition to preview data. Further, by referring to the Q table, the control unit 160 may calculate a variable compression ratio to be applied as the second compression condition to preview data 153 in order to generate a thumbnail image.

The control unit 160 may be configured to control collection and transmission of information, data processing, signal flows, and the like of the device 100. For an improvement in compression condition in an image data compression process, the control unit 160 may include elements shown in FIG. 2.

FIG. 2 is a block diagram illustrating a control unit of the electronic device shown in FIG. 1.

Referring to FIG. 2, the control unit 160 may include a variable compression ratio calculation unit 161, a thumbnail image compression unit 163, a capture image compression unit 165, and a storage manager 167.

The variable compression ratio calculation unit 161 may be configured to calculate at least one of the first and second compression conditions on the basis of preview data, depending on user's setting. For this, the variable compression ratio calculation unit 161 may offer a menu item or icon for triggering a compression condition improving mode and support the operation of a compression condition improving mode in response to a selection of such a menu item or icon. In an embodiment, when the camera 170 provides an original image, the variable compression ratio calculation unit 161 may generate a frame including a smaller size or pixel than that of the original image by resizing the original image to a preview frame size or by performing pixel adjustment. In some embodiments, if the camera 170 provides preview data, the variable compression ratio calculation unit 161 may not generate preview data separately.

When preview data is obtained, the variable compression ratio calculation unit 161 may provide the preview data to the display unit 140 to form a preview screen while applying a variable compression ratio to the preview data. For this, the variable compression ratio calculation unit 161 may analyze the image complexity of the preview data and, based on analysis results, calculate an optimum compression ratio for the preview data. Additionally, the variable compression ratio calculation unit 161 may temporarily store the calculated compression ratio as the first compression condition for an original image corresponding to the preview data. Meanwhile, the variable compression ratio calculation unit 161 may perform a real-time calculation of an optimum compression ratio for the preview data by applying a variable compression technique to preview data received or generated in real time. Then the variable compression ratio calculation unit 161 may store the calculated compression ratio as the first compression condition and continuously update it. Thereafter, when any input event for an image capture happens, the variable compression ratio calculation unit 161 may provide the first compression condition to the capture image compression unit 165.

Further, the variable compression ratio calculation unit 161 may calculate the second compression condition on the basis of size information about a fixed buffer for storing preview data and a thumbnail image. For this, the variable compression ratio calculation unit 161 may check information, such as tag information, recorded together at time to store a thumbnail image. Then by checking a percentage of such information in a thumbnail image, the variable compression ratio calculation unit 161 may check how much space is used to store an image in a thumbnail image. Thereafter, based on a buffer space to be used to store a pure image except for such information, the variable compression ratio calculation unit 161 may further adjust the second compression condition, e.g., a compression ratio, to be applied to preview data. Namely, the variable compression ratio calculation unit 161 may determine a variable compression ratio to be applied to the preview data through a complexity analysis of preview data and then further adjust the determined compression ratio by checking a buffer space to be used for an actual image in the total buffer space allocated for a thumbnail image. Alternatively, the variable compression ratio calculation unit 161 may determine a variable compression ratio to be applied to the preview data on the basis of a buffer space to be used for an actual image in a buffer allocated for a thumbnail image. The variable compression ratio calculation unit 161 may provide the calculated second compression condition to the thumbnail image compression unit 163.

Meanwhile, the variable compression ratio calculation unit 161 may optimize the utilization of a buffer to collect preview data. For example, if preview data is provided with a size of 3 Mbyte in an embodiment where the size of a buffer is set to 5 Mbyte to initially process an original image, a buffer size for such processing may be changed to 2 Mbyte. In this embodiment, the variable compression ratio calculation unit 161 may check a buffer size for an original image without outputting an error alert and then control a compression ratio to be applied to preview data to 2 Mbyte or less.

The thumbnail image compression unit 163 may be configured to compress, in order to generate a thumbnail image, at least one of an original image provided by the camera 170 and an acquired image used as preview image. In an embodiment, when an event for generating a thumbnail image happens, the thumbnail image compression unit 163 may perform the compression of an original image according to the second compression condition calculated on the basis of preview data and a buffer size allocated for storing a thumbnail image. Then the thumbnail image compression unit 163 may deliver the thumbnail image to the storage manager 167.

The capture image compression unit 165 may receive the first compression condition from the variable compression ratio calculation unit 161 when an event for collecting a capture image happens. This event may be one of various input events such as a shutter press event, a touch event of a virtual shutter key, a gesture event for selecting a virtual shutter key, or the like. And any preset event based on a predefined image analysis such as face recognition of the subject, gesture recognition of the subject, voice recognition of the subject, and recognition of a pause in movement of the device 100. If one of such events happens, the capture image compression unit 165 may receive a capture image collected by the camera 170 and perform a compression by applying the first compression condition to the capture image. Then the compressed data may be delivered to the storage manager 167.

The storage manager 167 may receive, from the capture image compression unit 165, a capture image compressed according to the first compression condition and then store it in the memory unit 150. Also, the storage manager 167 may receive, from the thumbnail image compression unit 163, a thumbnail image compressed according to the second compression condition and then store it in the memory unit 150. Such compressed data may be data compressed according to JPEG technique. When an event for searching for such a captured or thumbnail image happens, the storage manager 167 may retrieve the requested image from the memory unit 150 and deliver it to the control unit 160 to display it on the display unit 140.

FIG. 3 is a flow diagram illustrating a method for compressing image data collected by a camera in accordance with an embodiment of the present disclosure.

Referring to FIG. 3, at operation 301, the control unit 160 may determine whether an event for activating a camera function happens. If a current event is not for activating a camera function, the control unit 160 may perform a particular function in response to that event at operation 303. For example, the control unit 160 may perform a function to search for a capture image or a thumbnail image stored in the memory unit 150, a function to transmit such an image to other device, a function to receive an image from other device, or the like.

When an event for activating a camera function happens at operation 301, the control unit 160 may receive an image from the camera 170 at operation 305. In an embodiment, the control unit 160 may perform a control process for activating the camera 170, and therefore the camera 170 may perform an initialization process under the control of the control unit 160 and then provide an original image to the control unit 160.

After an original image is received from the camera 170, the control unit 160 may generate preview data from the received original image according to a predefined specific rule at operation 307. In an embodiment where the camera 170 provides an acquired image obtained from an original image, the control unit 160 may not perform operation 307.

Then, at operation 309, the control unit 160 may apply a variable compression technique to preview data and calculate the first compression condition (Q1) and the second compression condition (Q2). The first compression condition (Q1) may be a compression ratio calculated for a capture image by applying a variable compression ratio to preview data. The second compression condition (Q2) may be a compression ratio calculated for a thumbnail image by applying a variable compression ratio on the basis of a buffer size for storing a thumbnail image and a complexity analysis of preview data. Depending on a function supported by the device 100, at least one compression condition may be calculated at operation 309. Namely, in an embodiment where a compression condition improving mode for a capture image, only the first compression condition (Q1) may be calculated at operation 309. Alternatively, in an embodiment where a compression condition improving mode for a thumbnail image, only the second compression condition (Q2) may be calculated at operation 309. If a compression condition improving mode is for all of a capture image and a capture image, both the first compression condition (Q1) and the second compression condition (Q2) may be calculated at operation 309. Description given below corresponds to the latter embodiment.

At operation 311, the control unit 160 may determine whether an event for capturing an image happens. If a capture event such as a selection of a shutter key happens, the control unit 160 may compress a capture image by applying the first compression condition (Q1) to the capture image at operation 313. Additionally, if it is designed to display or store a thumbnail image together with a capture image, the control unit 160 may further compress a thumbnail image by applying the second compression condition (Q2) to the thumbnail image. After compression is completed, the control unit 160 may control the memory unit 150 to store the compressed capture image and the compressed thumbnail image. Thereafter, if an event for searching for the stored capture image and the stored thumbnail image happens, the control unit 160 may decompress both the capture image and the thumbnail image on the basis of compression ratios applied to a compression process and then control the display unit 140 to display such decompressed images. If a request to transmit such an image to other device happens, the control unit 160 may transmit the compressed image to other device without decompressing such an image. In this embodiment, header information of the compressed capture image may record information about a compression ratio calculated for preview data by means of a variable compression technique. Also, header information of the compressed thumbnail image may record the size of actually recorded image, information about a compression ratio applied to the image, tag information, and the like.

At operation 315, the control unit 160 may determine whether an event for closing a camera function happens. If there is no event, the control unit 160 may return to operation 305.

As discussed hereinbefore, the image data compression method may calculate an optimum compression condition, i.e., a compression ratio, by applying a variable compression technique to preview data generated from an original image, and apply the calculated compression ratio to a capture image. Additionally, this method may allow an optimal thumbnail image compression by adjusting a compression ratio on the basis of a buffer size changed according to tag information obtained when an image is collected.

According to the trend of digital convergence, the above-discussed device 100 may essentially or selectively further include any other elements such as a short-range communication module, a wired or wireless communication interface, an Internet communication module, a digital broadcast receiving module, and the like. Meanwhile, as will be understood by those skilled in the art, some of the above-mentioned elements in the device 100 may be omitted or replaced with another.

Additionally, the mobile device according to embodiments disclosed herein may be applied to various types of mobile communication terminals such as a cellular phone, a smart phone, a tablet PC, a handheld PC, a PMP (portable multimedia player), a PDA (personal digital assistant), a notebook, a portable game console, and the like.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for compressing image data of a camera, the method comprising:
   generating preview data of an image collected through the camera, wherein the preview data is generated from the collected image without further encoding;
   determining a first compression ratio through analyzing complexity of the preview data; and
   compressing a capture image as a function of the determined first compression ratio, wherein the capture image corresponds to the preview data selected in response to a capture command for capturing the collected image,
   wherein determining the first compression ratio comprises determining a compression ratio for each object contained in the preview data by referring a Q table, the Q table comprising compression ratios of the objects.

2. The method of claim 1, further comprising:
   storing the compressed capture image.

3. The method of claim 1, further comprising:
   receiving a request to search for the capture image;
   decompressing the capture image as a function of the first compression ratio; and
   displaying the decompressed capture image.

4. The method of claim 1, further comprising:
   transmitting the compressed capture image to other device, the compressed capture image including a header in which information of the first compression ratio is recorded.

5. The method of claim 1, further comprising:
   generating a thumbnail image corresponding to the capture image.

6. The method of claim 5, further comprising:
   collecting tag information for generation of the thumbnail image;
   checking a percentage of the tag information in a buffer allocated for the thumbnail image;
   determining a second compression ratio of the thumbnail image as a function of both the preview data and a buffer size except for the percentage of the tag information; and
   compressing the thumbnail image as a function of the second compression ratio.

7. The method of claim 6, further comprising:
   storing the compressed thumbnail image.

8. The method of claim 6, further comprising:
   receiving a request to search for the thumbnail image;
   decompressing the thumbnail image as a function of the second compression ratio; and
   displaying the decompressed thumbnail image.

9. The method of claim 6, further comprising:
   transmitting the compressed thumbnail image to other device, the compressed thumbnail image including a header in which information of the second compression ratio is recorded.

10. An electronic device comprising:
    a camera configured to collect an image;
    a memory unit configured to store a Q table; and
    a control unit configured to:
        generate preview data of the collected image, wherein the preview data is generated from the collected image without further encoding,
        analyze complexity of the preview data,
        determine at least one of a first compression ratio for a capture image through the analyzed complexity and a second compression ratio for a thumbnail image corresponding to the capture image, and compress at least one of the capture image and the thumbnail image as a function of at least one of the first compression ratio and the second compression ratio, wherein the capture image corresponds to the preview data selected in response to a capture command for capturing the collected image, and wherein, to determine the first compression ratio, the control unit is further configured to determine a compression ratio for each object contained in the preview data by referring to a Q table, the Q table comprising compression ratios of the objects.

11. The device of claim 10, further comprising:
a memory unit configured to store at least one of the compressed capture image and the compressed thumbnail image.

12. The device of claim 10, wherein the control unit is further configured to decompress the capture image as a function of the first compression ratio when a request to search for the capture image is received, and to display the decompressed capture image on a display unit.

13. The device of claim 10, further comprising:
a communication unit configured to transmit at least one of the compressed capture image and the compressed thumbnail image to other device, the compressed capture image including a header in which information of the first compression ratio is recorded, and the compressed thumbnail image including a header in which information of the second compression ratio is recorded.

14. The device of claim 10, wherein the control unit is further configured to collect tag information for generation of the thumbnail image, to check a percentage of the tag information in a buffer allocated for the thumbnail image, and to determine the second compression ratio of the thumbnail image as a function of both the preview data and a buffer size except for the percentage of the tag information.

15. The device of claim 10, wherein the control unit is further configured to decompress the thumbnail image as a function of the second compression ratio when a request to search for the capture image is received, and to display the decompressed thumbnail image on a display unit.

16. A non-transitory computer readable media containing processor readable code, the processor readable code comprising a set of instructions, that when executed by one or more processors, cause the one or more processors to:
generate preview data of an image collected through the camera, wherein the preview data is generated from the collected image without further encoding;
determine a first compression ratio through analyzing complexity of the preview data; and
compress a capture image as a function of the determined first compression ratio, wherein the capture image corresponds to the preview data selected in response to a capture command for capturing the collected image,
wherein determining the first compression ratio comprises determining a compression ratio for each object contained in the preview data by referring a Q table, the Q table comprising compression ratios of the objects.

17. The non-transitory computer readable media of claim 16, further comprising the operations of:
storing the compressed capture image.

18. The non-transitory computer readable media of claim 16, further comprising the operations of:
receiving a request to search for the capture image;
decompressing the capture image as a function of the first compression ratio; and
displaying the decompressed capture image.

19. The non-transitory computer readable media of claim 16, further comprising the operations of:
transmitting the compressed capture image to other device, the compressed capture image including a header in which information of the first compression ratio is recorded.

20. The non-transitory computer readable media of claim 16, further comprising the operations of:
generating a thumbnail image corresponding to the capture image.

* * * * *